United States Patent Office 2,815,342
Patented Dec. 3, 1957

2,815,342
SYNTHESIS OF PYRIMIDINE NUCLEOSIDE PHOSPHATES

Har G. Khorana, Vancouver, British Columbia, Canada, assignor to Canadian Patents and Development Limited, Ottawa, Canada, a company of Canada No Drawing. Application March 4, 1955,
Serial No. 492,313

9 Claims. (Cl. 260—211.5)

This invention relates to the synthesis of pyrimidine nucleoside 5'-monophosphates and 2',5'- and 3',5'-diphosphates. In this specification, the term "pyrimidine" includes both pyrimidine and derivatives thereof, such as uracil and cytosine.

A neucleoside is herein defined as an N-glycoside of a heterocyclic base. In the nucleosides of the present invention, these heterocyclic bases are pyrimidine or derivatives thereof.

Examples are:
(1) Uridine:

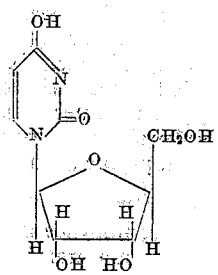

(2) Cytidine:

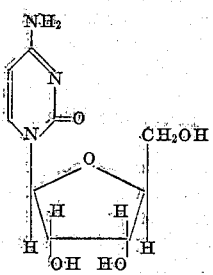

The pyrimidine nucleoside phosphates of the present invention may be either monophosphates or diphosphates. Examples are:

(3) Pyrimidine nucleoside 5'-phosphate:

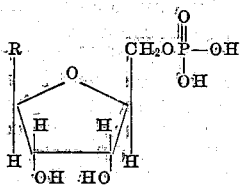

(4) Pyrimidine nucleoside 2',5'-diphosphate:

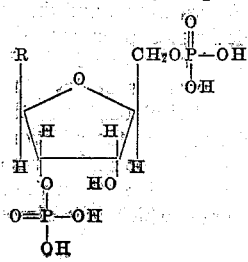

(5) Pyrimidine nucleoside 3',5'-diphosphate:

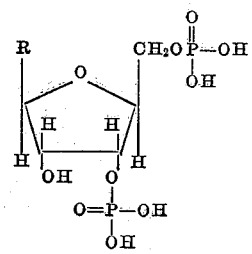

In the above examples R is a pyrimidine group such as uracil or cytosine or pyrimidine itself.

Nucleosides and nucleoside monophosphates (Example 3 above), in general, possess useful therapeutic and biological properties. In addition they may be used as intermediates in the synthesis of nucleoside polyphosphates which also possess useful therapeutic and biological properties. A suitable synthesis of nucleoside polyphosphates from nucleoside monophosphates is given in my co-pending application, Serial No. 437,006, filed June 15, 1954, and published in the Journal of the American Chemical Society 76, pages 3517 and 5056 (1954).

Nucleosides and nucleoside monophosphates may also be used as intermediates in the synthesis of nucleoside di- and triphosphates which also possess useful therapeutic and biological properties. Nucleoside 5'-phosphates have previously been obtained as products of enzymetatic degradation of ribonucleic acids, and have been reported by Cohn and Volkin in the Journal of Biological Chemistry, 203, 319 (1953). Recently cytidine diphosphate and uridine diphosphate (shown in Examples 4 and 5 above) have been required in certain enzymatic studies.

The problem of chemical phosphorylation of nucleosides is one of considerable importance and complexity. The common phosphorylating agents and well-known simple methods have not been used because of the well-known lability of the N-glycosidic linkage, especially in the purine nucleosides. Therefore, more complex phosphorylating agents and techniques have been used.

For example, Levene & Tipson, who reported their work in the Journal of Biological Chemistry 106, 113 (1930) and 121, 131 (1937), Michelson and Todd, who reported their work in the Journal of the Chemical Society, 2476 (1949) and Gulland and Holiday, who reported their work in Journal of the Chemical Society, 746 (1940), used phosphorus oxychloride as the phosphorylating agent, with fair results. Bredereck, Berger and Ehrenberg, who reported their work in Berichte 73, 269 (1940), used diphenyl phosphorochloridate. The most satisfactory results were obtained, however, when dibenzyl phosphorochloridate was used as the phosphorylating agent. This reagent was also used by Michelson and Todd and reported in the Journal of the Chemical Society, 2476 (1949).

It is the main object of the present invention to disclose a convenient, economically and technically suitable, procedure for the synthesis of pyrimidine nucleoside 5'-monophosphates, and nucleoside 2',5'- and 3',5'-diphosphates.

According to the present invention, the process for the preparation of a pyrimide nucleoside phosphate comprises reacting a compound, selected from the group consisting of a pyrimidine nucleoside and its 2',3'-isopropylidene derivative with activated phosphoric acid.

In the present application, the term "activated phosphoric acid" is defined as phosphoric acid which has been made reactive by the addition of energy, either in the form of heat or by the addition of $P_2O_5$.

The preferred nucleosides of the present invention are defined by the following formula:

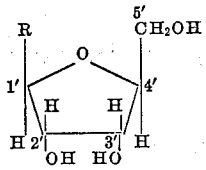

The numbers represent the designation of the various carbon atoms in the D-ribose part of the nucleoside. R is a pyrimidine group such as uracil or cytosine or pyrimidine itself.

The nucleoside 5'-monophosphates are preferably prepared using a 2',3'-isopropylidene nucleoside of the following formula:

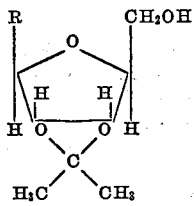

where R is a pyrimidine. The nucleoside 2',5'- and 3',5'-diphosphates are preferably prepared using the free nucleoside although they may also be prepared from the 2',3'-isopropylidene derivative.

It has been generally convenient to follow the course of the synthesis reaction by paper chromatography. 2',3'-isopropylidene uridine was dissolved in a mixture of phosphorus pentoxide and phosphoric acid at about 60° C. Aliquot portions were drawn off periodically, diluted, and heated to a temperature of about 100° C. for about 2 hours. The purpose of the heating was to hydrolyse the inorganic polyphosphates and to remove the isopropylidene group. After a two hour reaction period the main product was uridine 5'-monophosphate; longer periods of time resulted in some "phosphorolytic" cleavage of the isopropylidene group to form the diphosphates.

In a large scale (5 g.) two hour experiment, after the hydrolitic treatment, most of the resulting orthophosphoric acid was removed as lithium phosphate (by the addition of lithium hydroxide). The uridine 5'-monophosphate (the main product) was freed from the small amounts of the accompanying uridine and uridine diphosphates on a Dowex 2 ion exchange column. After a water wash which removed uridine, uridine 5'-phosphate was eluted, along with the residual orthophosphoric acid, with 0.015 N hydrochloric acid. The $R_f$ values of the uridine 5'-monophosphate prepared by this method on paper chromatograms in several solvent systems were identical with those of a sample of uridine 5'-monophosphate prepared by previously known methods. The elegant ion exchange technique of Cohn and Volkin, reported in the Journal of Biological Chemistry 203, 319 (1953), which successfully differentiated uridine 5'-monophosphate from the isomeric 2'- and 3'-monophosphates was used as a further check that the product of the reaction was indeed the 5'-isomer. Finally, rigid chemical evidence was also obtained concerning the identity of the reaction product.

The following examples are given to illustrate the method of preparation of the nucleosides 5'-phosphates and 2'(3')5'-diphosphates by the present application.

Example I.—Phosphorylation of 2',3'-isopropylidene uridine 200 mg. of 2',3'-isopropylidene uridine was stirred into a warm freshly prepared solution (1 cc.) of phosphorus pentoxide in 85% phosphoric acid (1:1.3 w./w.) and the mixture, which was stirred at intervals, was maintained at a temperature of 60° C. with the exclusion of moisture. The isopropylidene uridine gradually dissolved to form a liquid yellow solution. Aliquots of 0.2 cc. were removed at intervals and diluted with 2 cc. of water. The clear solutions were heated at 100° C. for one half hour and then neutralized with 4.5 N lithium hydroxide solution. The supernatant liquid, after separation of lithium phosphate by centrifugation was examined by paper chromatography in the solvent system 1% ammonium sulfate-isopropyl alcohol (1:2 v./v.). Three spots, located by their absorption of ultraviolet light, had $R_f$ values corresponding to uridine, uridine 5'-monophosphate and uridine 2'(3'),5'-diphosphate. Their relative concentrations were determined by elution with 3 cc. of 0.01 N hydrochloric acid, and measurement of the optical density of the resulting solutions at 260 mμ. Table I records the results thus obtained.

| Time (hours) | Uridine (percent) | Uridine 5'-phosphate (percent) | Uridine 2'(3'), 5'-diphosphate (percent) |
|---|---|---|---|
| 1 | 37.4 | 62.6 | |
| 2 | 11.7 | 80.4 | 7.9 |
| 3.5 | 6.3 | 70.6 | 23.1 |

Before discussing these results it should be mentioned that the time is variable depending upon the temperature of the reaction. Thus, the lower the temperature, the longer the reaction time.

Thus it is evident from the above table that the reaction time of two hours gives the optimum yield of the required uridine 5'-monophosphate. Less reaction time results in an appreciably less conversion of uridine to uridine 5'-monophosphate, while greater than two hours results in the greater phosphorolytic cleavage of the isopropylidene group thus forming more of the diphosphates.

Example II.—Uridine 5'-monophosphate 5 g. of dry 2',3'-isopropylidene uridine was phosphorylated with 25 cc. of warm freshly prepared solution of phosphorus pentoxide in 85% phosphoric acid, as described in Example I. After a reaction period of two hours, 100 cc. of cold water was added and the clear solution heated at 100° C. for one-half hour, when the solution attained a light pink colour. The solution was then neutralized with 4.5 N lithium hydroxide solution to a pH of 9, and the heavy precipitate of lithium phosphate removed by centrifugation, the precipitate being thoroughly washed with three 40 cc. portions of water. The combined filtrate and washings (about 500 cc.) were concentrated under reduced pressure to about 50 cc., when some more lithium phosphate was precipitated. This was removed, by centrifugation, and the supernatant liquid absorbed on the top of a Dowex 2 ion exchange resin (220 to 325 mesh; chloride form, in a column 14 cm. long by 4 cm. diameter) and the column washed with water until the optical density fell below 0.05. After removal of the uridine in this way (about 1 litre of water was required) 0.015 N hydrochloric acid was passed through the column at a flow rate of 15 cc. per minute. Optical density at 260 mμ) of the effluent began to rise after 800 cc. of the solution had passed through the column. Four litres of orthophosphoric acid, were collected before the optical density fell below 0.8 again. This solution was concentrated at 30 to 35° C. under reduced pressure to a volume of about 20 cc., the concentrate sucked under a high vacuum for six hours, and the final residue kept in an evacuated desiccator over potassium hydroxide and phosphorus pentoxide for two days. It was then washed twice with 50 cc. portions of dry ether, dissolved in 10 cc. of anhydrous ethyl alcohol, and the uridine 5'-monophosphate precipitated by the addition of 100 cc. of anhydrous ether. The last operation was repeated twice, the ethereal layer being clarified through centrifugation.

The residual gum, which was almost completely free from orthophosphoric acid, changed into a brittle resin on storage in an evacuated desiccator over phosphorus pentoxide. This brittle resin was then taken up in 40 cc. of water, and neutralized to pH 9 with 4.5 N lithium hydroxide. To this solution was added 10 cc. of 2 M barium acetate solution, and the mixture set aside for several hours. The precipitate of barium phosphate (0.340 g. dry weight, admixed with some barium uridine 5'-monophosphate) was removed by centrifugation, and the remaining barium uridine 5'-monophosphate in solution was precipitated by the addition of an equal volume of ethyl alcohol. The product was collected by centrifugation, and washed twice with 25 cc. portions of 50% ethyl alcohol, then with ethyl alcohol alone, and finally with ether. The yield of hydrated barium salt was 5.42 g. and was found to contain 3.74 g. of free uridine 5'-monophosphate (65% yield). Paper chromatography in a number of solvent systems gave a single strong spot, having $R_f$ values identical with those obtained using a sample of uridine 5'-monophosphate prepared by the previously used methods. The method of paper chromatography of uridine 5'-monophosphate in a number of solvent systems is being presented to the Journal of American Chemical Society in an article by Hall and Khorana entitled "Nucleoside Polyphosphates III."

*Example III.—Cytidine 5'-phosphate*

2',3'-isopropylidene cytidine was phosphorylated as described for the corresponding uridine compound in Example II, except that the time of reaction was one hour at a temperature of 60° C. After this time, water was added and the clear solution heated on a water bath for ½–1 hour. The solution was evaporated to a syrup under vacuum and the syrup extracted twice with ethyl ether. Orthophosphoric acid was removed in this way and the insoluble mixture of cytidine phosphates dissolved in water, neutralized with sodium hydroxide and applied on top of a Dowex 2 ion exchange resin column (formate form).

Cytidine 5'-phosphate was eluted with 0.02 N formic acid. Evaporation of the formic acid solution gave crystalline cytidine 5'-phosphate in a yield of about 60%.

*Example IV.—Uridine 2'(3'), 5'-diphosphate*

To one gram (4.1 m. mole) of uridine (dried previously at 110°/0.1 mm. over phosphorus pentoxide for 12 hours) was added 5 cc. of warm freshly prepared phosphorylating agent (see Example II above) and the sealed reaction flask maintained at 60° in an oven. Uridine dissolved under frequent agitation during the first one half hour to form a clear dark syrup. Direct examination by paper chromatography of a suitable amount of the fluid removed after a period of 2.5 hours and diluted with water showed only a small amount of unreacted uridine. After a total period of 20 hours the syrup was dissolved in 60 cc. of water and a small quantity of 6 N hydrochloric acid added to reduce the pH of the aqueous solution to 0. After being heated at 100° for 15 minutes, the solution was neutralized with 4.5 N lithium hydroxide solution to pH 9.

The heavy precipitate of lithium phosphate was removed by centrifugation and washed thoroughly with small portions of water. The combined supernatants were allowed to pass slowly through a bed (12.5 sq. cm. x 4.2 cm.) of Dowex 2 ion exchange resin (200–325 mesh; chloride form). After a water wash which removed some uridine (about 4.4% of the amount of uridine used), uridine monophosphates and orthophosphoric acid were eluted with .01 N hydrochloric acid+.015 M sodium chloride solution (total volume, 4 litres representing 4.7% of the amount of uridine used). The diphosphates were then eluted with .01 N hydrochloric acid+.1 M sodium chloride solution and found to represent a conversion of 80.6% of the amount of uridine used to the diphosphates.

This eluate was neutralized with sodium hydroxide and then concentrated under partial pressure to about 18 cc. After filtration of the solution, to remove any suspended matter, through a sinter glass funnel, which was later washed with 2 cc. of water, the pH was adjusted to 9 with lithium hydroxide solution and the barium salts were precipitated by the addition of 7 cc. of 2 M barium acetate solution and collected through centrifugation. These were washed three times with 50% ethyl alcohol, then ethyl alcohol and ether and allowed to equilibrate with air at room temperature. Wt., 2.52 g., 75% yield.

*Example V.—Cytidine 2'(3'),5'-diphosphate*

A mixture of two hundred mg (0.824 m. Mole) of cytidine (previously dried at 110°/0.1 mm. over phosphorus pentoxide for 12 hours) and 1 cc. of a freshly prepared solution of phosphorus pentoxide in phosphoric acid (1:1.3, W./W.) was heated when cytidine slowly dissolved to give a clear homogeneous syrup. After a period of 20 hours the syrup was dissolved in 15 cc. of water and the solution treated as described above for uridine diphosphate. After removal of lithium phosphate the solution (about 50 cc.) was slowly passed through a Dowex 2 (200–325 mesh; formate form) ion exchange bed (12.5 sq. cm. x 2.0 cm.). After a water wash (1000 cc.) which removed only negligible amount of ultra-violet absorbing material (showing the absence of cytidine), 1500 cc. of 0.01 N formic acid +.05 N sodium formate solution were passed, a flow rate of 15 cc. per minute being maintained during this and the following elutions.

Cytidine monophosphates thus removed corresponded to 4.7% of the amount of cytidine employed. The diphosphates were next eluted with 4.0 N formic acid +.01 M sodium formate (and found to represent 74% of the amount of cytidine employed). Subsequent elution with 1.0 N formic +1.0 M sodium formate removed a small amount of material (about 3% of the amount of cytidine employed) corresponding presumably to 2', 3', 5'-triphosphate. The eluate containing the diphosphates was concentrated to half its volume in vacuo, then diluted with an equal volume of water and reevaporated. This process was repeated four times before the volume was reduced to 25 cc., this solution being freeze-dried.

The residue was dissolved in 2.5 cc. of water, filtered through a fritted glass funnel, which was subsequently washed with 1 cc. of water. To the combined filtrate and washing, after neutralization with 4.5 N lithium hydroxide solution to pH 9, was added 1.6 cc. of 2 M barium acetate solution. Ten cc. of 95% ethyl alcohol was added and the precipitated barium salts were collected by centrifugation and washed thoroughly with three portions of 60% ethyl alcohol, then with ethyl alcohol and ether. Yield 430 mg.

I claim:

1. A process for the preparation of a pyrimidine nucleoside 5'-monophosphate which comprises reacting a 2',3'-isopropylidene pyrimidine nucleoside with a mixture of phosphorus pentoxide and phosphoric acid.

2. A process for the preparation of pyrimidine nucleoside monophosphate which comprises reacting a 2',3,-isopropylidene pyrimidine nucleoside with a warm mixture of phosphorus pentoxide and concentrated phosphoric acid.

3. A process as claimed in claim 1 in which the ratio of phosphorus pentoxide to phosphoric acid is 1.3 to 1 on a weight basis.

4. A process for the preparation of a pyrimidine nucleoside selected from the group consisting of 2',5'-diphosphates and 3',5'-diphosphates which comprises reacting a pyrimidine nucleoside with a mixture of phosphorus pentoxide and phosphoric acid.

5. A process for the preparation of a pyrimidine nucleoside selected from the group consisting of 2',5'-diphosphates and 3',5'-diphosphates which comprises reacting a pyrimidine nucleoside with a mixture of phosphorus pentoxide and phosphoric acid.

6. A process as claimed in claim 5 in which the ratio of phosphorus pentoxide to phosphoric acid is 1.3 to 1 on a weight basis.

7. A process for the preparation of a pyrimidine nucleoside 5'-monophosphate which comprises reacting a 2',3'-isopropylidene pyrimidine nucleoside with a mixture of phosphorus pentoxide and phosphoric acid and hydrolysing the reaction product to remove the isopropylidene group.

8. A process as claimed in claim 1 in which the pyrimidine is uracil.

9. A process as claimed in claim 1 in which the pyrimidine is cytosine.

References Cited in the file of this patent

UNITED STATES PATENTS 2,052,029    Harris _____ Aug. 25, 1936

FOREIGN PATENTS 141,280    Australian _____ Mar. 4, 1948

OTHER REFERENCES

Hudson et al.: "Advances in Carbohydrate Chemistry," vol. 6, published by Academic Press (N. Y.), 1951 (page 170 relied on).

Atherton et al.: "Journal Chemical Society," 1945 (pp. 382 to 385 relied on.)